F. L. G. KOLLMORGEN.
PERISCOPE.
APPLICATION FILED FEB. 3, 1916.
1,309,639.
Patented July 15, 1919.
2 SHEETS—SHEET 1.
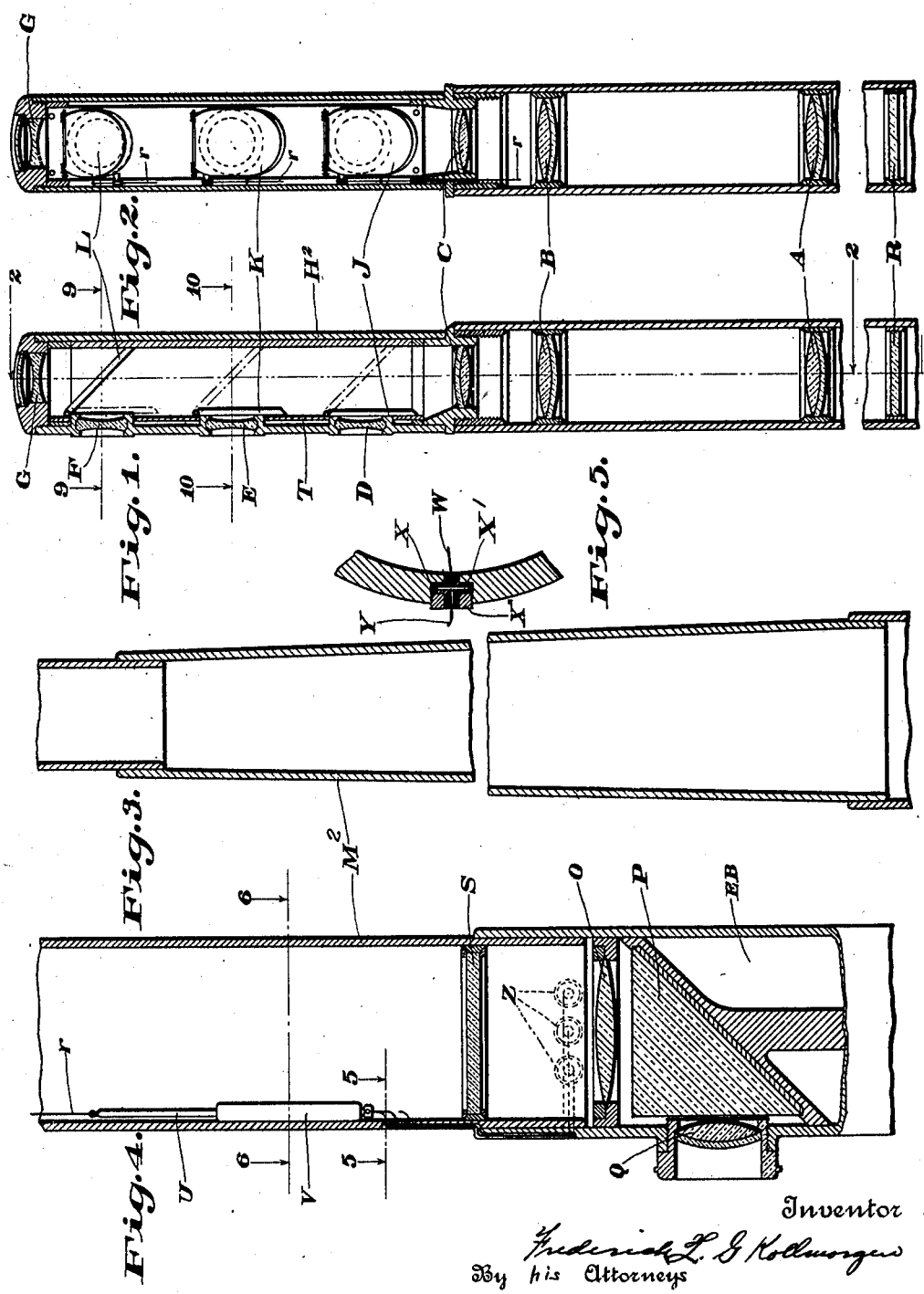

F. L. G. KOLLMORGEN.
PERISCOPE.
APPLICATION FILED FEB. 3, 1916.
1,309,639.
Patented July 15, 1919.
2 SHEETS—SHEET 2.
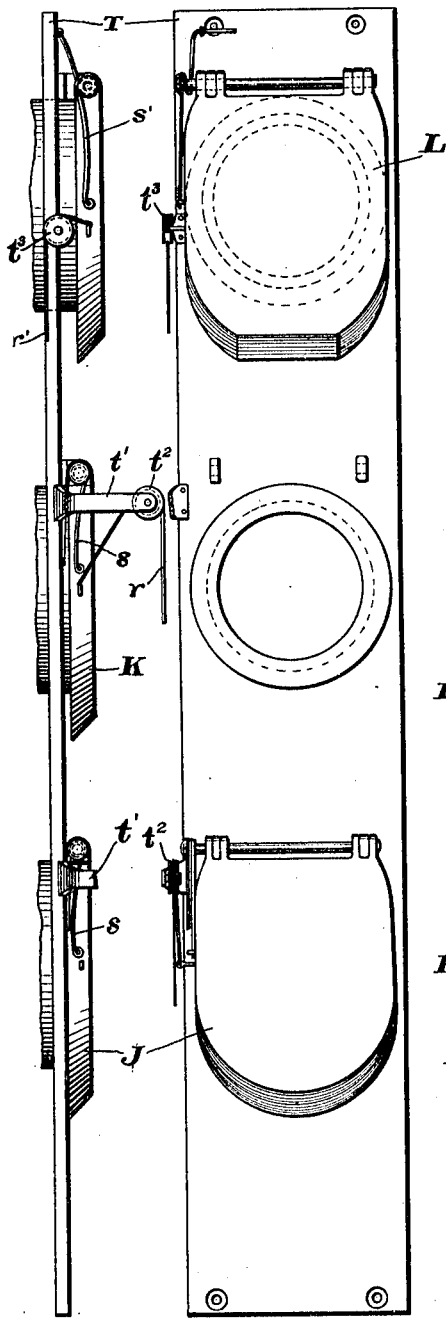
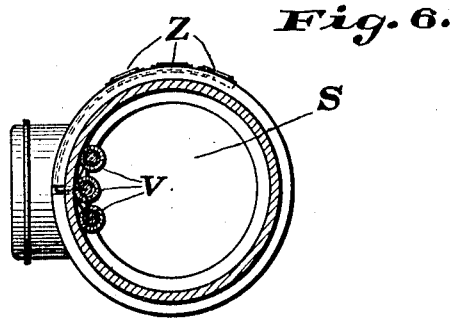
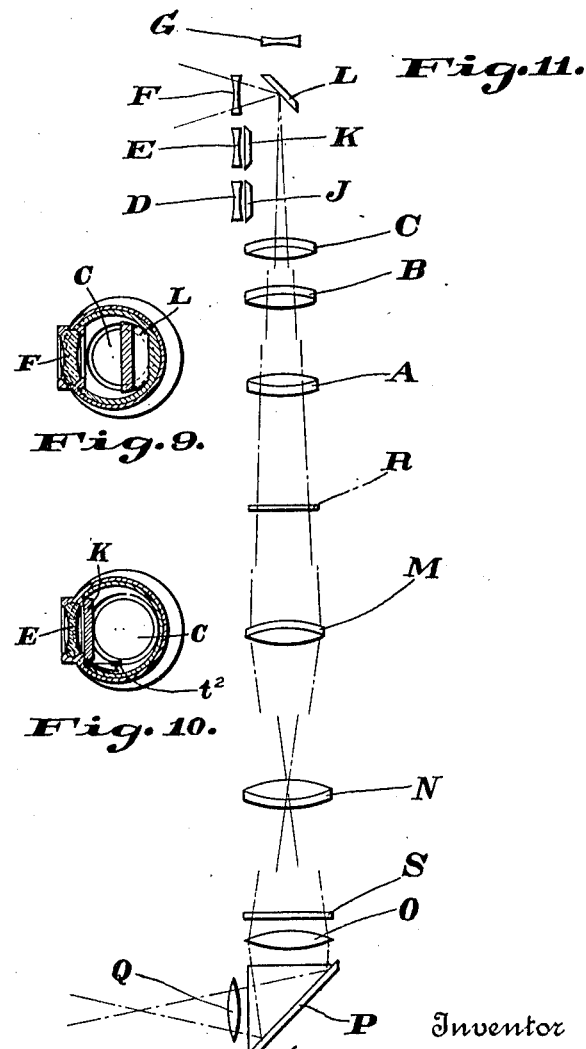

UNITED STATES PATENT OFFICE.

FREDERICK L. G. KOLLMORGEN, OF MOUNTAIN LAKES, NEW JERSEY.

PERISCOPE.

1,309,639.  Specification of Letters Patent.  Patented July 15, 1919.

Application filed February 3, 1916. Serial No. 75,920.

*To all whom it may concern:*

Be it known that I, FREDERICK L. G. KOLLMORGEN, a citizen of the United States, and a resident of Mountain Lakes, county of Morris, and State of New Jersey, have invented certain new and useful Improvements in Periscopes, of which the following is a specification.

My invention relates to improvements in periscopes particularly for the use of submarine boats and it has for its objects—

First, to obtain a choice of different powers of magnification in as small a head as possible and Second, to effect the change of magnification in such a manner that the complete moisture-tightness of the instrument is safeguarded.

It is of considerable importance in submarine warfare that the part of the periscope projecting out of the water should be as small as possible and this has been obtained, according to my invention, in a very simple manner.

According to the construction shown the operator of the periscope may have a choice of any one of three or even more powers for horizontal vision and an overhead vision is also rendered possible in an instrument that is no larger than is customary with the ordinary present day single powered instrument.

To make my invention clear it may be advisable to first describe in a general manner the principle of construction of a periscope. The object of such an instrument is to carry a comparatively large field of view through a long narrow tube and reproduce it at the eyepiece end with a comparatively low magnification. This is usually achieved by constructing the instrument out of two independent astronomical telescopes. It is well known that a telescope takes an object appearing in reality under a small angle and presents it to the eye under an angle larger than the original in accordance with the magnifying power. For instance a telescope having a power of 30 will present an object subtending an angle of 1° through the eyepiece under an apparent angle of 30°. If, however, the telescope is looked through from the objective end the object will appear smaller in exactly the same proportions as the telescope magnifies, that is, an object actually subtending a 30° angle will only appear to subtend 1° when viewed through the objective end of a telescope magnifying thirty times and this narrow angle will easily pass through a long narrow tube. Thus, by placing two such telescopes in one tube with the objectives facing each other the top one will decrease the size of the image to 1/30 of the original and the angle of view from 30° to 1°. The lower telescope will expand this angle of 1° to 30° and will remagnify the reduced image thirty times, thus presenting it to the eye exactly as it would appear if seen direct. In other words, such a periscope will have no magnification at all.

If it is desired to give the periscope magnification it is only necessary to decrease the magnification in the upper telescope as that would decrease the reduction when used in the inverted position. If two or several magnifications are desired we could obtain these by substituting different eyepieces in the upper telescope, but as each one of these eyepieces is by necessity rather large and bulky the head of the periscope would assume unwieldy dimensions if it had an arrangement for exchanging these eyepieces.

Recourse has therefore been had to another means of changing the power; namely, the introduction of a third or auxiliary telescope, as it may be called. This auxiliary telescope may be chosen in such a way that its eyepiece lenses are comparatively small. If this auxiliary telescope is chosen of the astronomical form the eyepiece lenses have to be collective lenses, and as an astronomical telescope gives an inverted image the remaining parts of the periscope must be arranged in such a manner as to reinvert the image. The most satisfactory way, however, is to make this auxiliary telescope of the so-called Galilean form, for instance as used in ordinary field glasses, as this is the shortest and most compact form of telescope. This Galilean telescope is usually placed near the top reflector of the periscope in such manner that the positive lens or objective of the Galilean telescope stands on one side of the reflector and the negative or eyepiece lens on the other side of the reflector. This small telescope therefore either augments or decreases the degree of reduction in the upper telescope and thus varies the magnification of the whole instrument.

According to my invention use is made of the auxiliary telescope, but the invention is not necessarily limited to the Galilean type, although that is the form of telescope which is preferably used. When a Galilean telescope is set for parallel rays its length is equal to the difference between the focal lengths of the objective and that of the eyepiece and its magnification to the quotient of the two focal lengths. Different magnifications therefore yield telescopes of different lengths and this feature has been taken advantage of in my invention.

As showing a specific embodiment of the invention reference is made to the drawings forming a part of this specification, in which drawings—

Figure 1 shows in cross section a head portion of a periscope which is constructed so as to embody my invention.

Fig. 2 is a sectional view taken as along the line 2—2 of Fig. 1 looking in the direction of the arrows.

Fig. 3 is a sectional view illustrating an intermediate portion of the periscope tube.

Fig. 4 is a sectional view illustrating the lower or eyepiece end of the periscope.

Fig. 5 is a sectional view taken as on the horizontal plane indicated by the line 5—5 Fig. 4 looking in the direction of the arrows.

Fig. 6 is a sectional plan view taken as on the horizontal plane 6—6 of Fig. 4 looking in the direction of the arrows.

Figs. 7 and 8 are rear and side views, respectively, showing the reflectors and the carrier upon which they are mounted and a part of the mechanism for operating the reflectors.

Figs. 9 and 10 are sectional views taken on the planes as indicated by the lines 9—9 and 10—10, respectively, in Fig. 1; and Fig. 11 is a diagrammatic view indicating in general the arrangement of the optical elements which are in the periscope.

In the drawings A and B designate the eyepiece lenses of the upper telescope and C the objective lens of the auxiliary Galilean telescope. D E F and G designate lenses which constitute the eyepieces of different Galilean telescopes, all of which telescopes, however, have a common objective lens, to wit, lens C. The lenses D E F and G are all of different powers and are all placed in such a way that parallel rays coming from the object being viewed issue parallel through the objective lens C. The eyepiece lenses D E F and G are frequently and properly referred to as entrant lenses and it will also be observed they are all concave lenses. The objective lens C is a collective lens and as above indicated is a lens which is common to the several lenses D E F and G. The concave entrant lens G is arranged so that its optical axis extends along the tube or, in other words the lens itself extends transversely to the tube. The concave entrant lenses D E and F are carried in or by the walls of the tube H and the optical axis of each of these lenses extends transversely the tube, or in other words, the lenses themselves may be referred to as extending along the tube.

Similarly, lenses such as A B and C may be referred to as lenses which extend transverse to the tube of the periscope and the optical axis of each of these lenses extends in the same general direction as the tube carrying the lenses. The eyepiece lens G is utilized only for overhead vision. The eyepiece lenses D E and F are utilized for horizontal vision, one at a time. To the eyepiece lenses D E and F there belong the reflectors J K and L which are utilized one at a time to reflect the rays passing through one of the eyepiece lenses D E and F downwardly along the periscope tube. In Fig. 1 the reflector L is the only reflector that is shown in operative position and when the reflector L is in the position shown in this figure the eyepiece or entrant lens F is the lens which is in operative relation with the lens C and the rest of the lenses in the periscope. It will be observed that when the reflector L is in the position shown in Fig. 1 that the reflectors J and K are out of the way or are swung to the inoperative position shown in said figure. The reflector L also, at this time, obstructs the view through the entrant lens or eyepiece G. When it is desired to have an overhead vision this reflector L is moved from the full line to the dotted line position shown in Fig. 1, thus leaving the view unobstructed between the entrant lens G and the objective lens C. When the periscope is thus used for overhead vision the fore and aft direction in the field of view will be exchanged owing to the reflector action of the lower eyepiece reflector prism not being compensated by any other reflection at the top, but this exchange of direction is practically not objectionable and if desired could easily be corrected by the insertion of a rectifying prism. Should it be desired to utilize the entrant lens E the reflector K is swung from the vertically extending full line position to the position indicated by dotted lines, the reflector J remaining in the full line position; likewise if it is desired to utilize the entrant lens D the reflector J is swung from the vertically extending position to the inclined position whereby lenses D and C will be in operative relationship. The lenses of the upper telescope are the lenses A and B, previously referred to, and the objective lens M. The lower telescope may have the objective lens N, the field lens O, the reflecting prism P and the eye lens Q. The periscope tube may also have the usual telemeter R and any suitable protecting plate S.

It will be observed from what has preceded that the reflectors in effect may be considered movable reflecting means because all of the reflecting surfaces can be positioned so that a view may be made through any one eyepiece or entrant lens at the head of a periscope. There are three movable reflectors (the reflectors J, K and L) and these reflectors are pivotally mounted upon a carrier T that is secured to the tube $H^2$ of the periscope in the proper position relative to the entrant lenses D E and F. The reflectors are mounted so that they can swing from an inclined position to a vertically extending position as indicated in Fig. 1. The carrier T is provided with arms $t^1$ $t^1$ which carry at the free end thereof pulleys or idler-wheels $t^2$ over which pass cables $r$. A spring $s$ also extends from the carrier to the reflector K and the function of this spring $s$ is to force the reflector from the inclined or operative position and hold it in the vertically extending or inoperative position. The function of one of the cables $r$ is to pull the reflector K from the vertically extending position to the inclined operative position and hold it in said last mentioned position. The lower end of the cable $r$ that operates the reflector K is connected to the core U of a solenoid V (see Fig. 4) and when the solenoid is energized a pull is exerted upon the cable whereby the reflector K will be moved to inclined operative position and will be held in said position as long as the solenoid is energized. The mechanism for operating the reflector J is illustrated the same as that for operating the reflector K. As to the reflector L a mechanism the same in principle but different in form has been illustrated. The reflector L is forced from the vertically extending position to inclined operative position and is held in the last mentioned position by means of a spring $s^1$. It is moved from the operative to the inoperative position through the medium of a cable $r^1$ which passes over a pulley $t^3$.

It will be observed that the lower end of this cable $r^1$ is connected to the core U of the solenoid V and the pull is exerted by energizing the solenoid so as to draw the core and rope attached thereto toward the solenoid. There is a core and solenoid for each reflector, as will be observed from an inspection of Fig. 6. One terminal of each of the solenoid coils is grounded in the periscope tube while the other terminal of each of the coils passes through the walls of the same tube, as is shown in Fig. 5. It will be observed from an inspection of this figure that one of the terminals of the solenoid coil, as W, is connected at one side of a metallic disk shaped member X. The other side of this metallic disk shaped member X is connected as by wire Y to one terminal of a switch or push button, the other terminal of which switch or push button is also grounded in the tube of the periscope whereby upon a closing of the switch the proper solenoid will be closed. There are three switches Z one for each solenoid. The disk shaped member X previously referred to is insulated from the periscope tube by suitable material as $X^1$ and the insulating material with the disk is held in place as by means of a screw $X''$. The several solenoids and cores therefore may be considered as three separate electrical engines or motors, viz. electrical power means for actuating the reflecting means.

It will be observed that all of the movable elements for actuating the reflecting means are located within a sealed tube which is both air and moisture tight and there is no reason why the tube should not remain moisture tight since there are no movable elements which pass through the tube or casing. In this way there is little likelihood that any dampness will enter the tube and any one or more of the several optical elements become fogged, and I believe I am the first to construct a hermetically sealed periscope tube having therein movable elements which are electrically actuated and this is an important feature of my invention.

From what has preceded it will be observed that the operator can take a view of an object through any one of the entrant lenses, as desired, by properly closing one or more of the switches or push buttons at Z Z Z dependent upon which particular entrant lens he desires to view an object through.

The tube of the periscope may be considered to consist of two parts, to wit, the main tube $M^2$ and the head tube $H^2$. The construction shown can be completely assembled in the factory and hermetically sealed down to the protecting glass plate S at the bottom of the main tube. The eyepiece box EB is secured at the lower end of the main tube $M^2$. The batteries that supply energy for operating the solenoids or electrical means may be placed in any convenient position and the position of the batteries and their connections is not shown, but manifestly they should be located somewhere exterior of the main tube of the periscope.

It will be noted, however, that if no torpedo director is to be attached to the bottom of the periscope the most convenient place for the battery cells that actuate the solenoids would be directly below the eyepiece box EB. If, however, the attachment of a torpedo director renders this position impossible the batteries could be carried anywhere outside of the periscope and connections made as by sliding contacts, such as insulated copper rings.

The improvements herein set forth are not limited to the precise construction and arrangement shown and described for they may be embodied in various forms and modifications without departing from the spirit and scope of the invention. For instance, a motor or motors may be substituted for the solenoids, or, the objective of the auxiliary Galilean telescope may be omitted and the eyepiece lenses A and B correspondingly strengthened without changing the character of my construction.

What is claimed is:

1. A periscope having a plurality of entrant lenses, one being placed so that its optical axis extends along the tube of the periscope, others being placed one above another and with their optical axes extending transversely said tube, and movable reflecting means suitably arranged so that operative relationship of any one of the entrant lenses can be established with the rest of the lenses in the periscope.

2. A periscope capable of giving different magnifying powers having a plurality of entrant lenses of different focal lengths, said periscope also having reflecting means constructed and arranged so that operative relationship can be established at will between any one of the entrant lenses and the rest of the lenses of the periscope.

3. A periscope having a plurality of entrant lenses of different focal lengths disposed so that each one will give a sharply focused image when brought into operative relationship with the other optical elements of the periscope, and reflecting means constructed and arranged so that operative relationship can be established with any one of said entrant lenses and the rest of the optical elements in the periscope.

4. A periscope having in its head a collective lens constituting the objective lens of a Galilean telescope and a plurality of concave entrant lenses any one of which in conjunction with said collective lens constitutes a Galilean telescope, and movable reflecting means whereby when properly positioned some one of said entrant lenses will be in operative relation with said objective.

5. A telescopic instrument comprising in combination therein a convex lens and a plurality of concave entrant lenses arranged at an angle relative to the convex lens, and means whereby at one time the convex lens and one of the entrant lenses will constitute lenses in a telescope and whereby at another time the same convex lens and another entrant lens will constitute the lenses in a telescope.

6. A telescopic instrument having lenses constituting telescopes of different powers, which telescopes have a convex lens common to each but different entrant lenses, the instrument also being provided with reflectors whereby when one of the reflectors is in proper position it will cause one of the entrant lenses to be in operative relationship in respect to said convex lens and whereby when said reflector is out of position and another is in position another one of the entrant lenses and said convex lens will be caused to be in operative relationship.

7. A periscope comprising in combination a horizontal convex lens, a horizontally extending concave entrant lens and a plurality of vertically extending concave lenses of different focal lengths arranged at different distances from said convex lens, and movable reflecting means which can be positioned so that at one time one of the vertically extending entrant lenses will be in coöperative relation with said convex lens and at another time another of said entrant lenses will be in coöperative relation with the same convex lens and so that at another time the horizontally extending entrant lens will be in coöperative relation with said convex lens.

8. A periscope having a tube supporting therein a convex lens which extends transversely the tube, said tube also supporting at different places along its length a plurality of concave entrant lenses of different focal lengths, said tube having therein swinging reflectors arranged to reflect an image from the entrant lenses to the convex lens which reflectors are arranged so that when not in use they can be moved out of the way whereby they will not obstruct the view from the convex lens through any entrant lens which is sought to be utilized.

9. A periscope having a tube carrying a convex objective lens that extends transversely the tube, a transversely extending concave entrant lens and a plurality of longitudinally extending concave lenses arranged along the tube at different distances from the objective lens and hinged reflectors corresponding in number to the longitudinally extending lenses which hinged reflectors are arranged so that they can all swing from the position where they obstruct the view from the objective lens through the transversely extending eyepiece lens and so that any one of the reflectors can be positioned whereby an object can be viewed through the objective and its particular longitudinally extending eyepiece lens.

10. A periscope having a tube or casing carrying the lenses of an upper and lower telescope which upper telescope comprises or has as a part thereof an auxiliary telescope having a convex lens, a plurality of entrant lenses arranged one above the other and mounted in the sides or walls of said tube, and reflecting means constructed and arranged so that, as desired, any one of the entrant lenses will be in coöperative relationship with said convex lens.

11. A periscope having in combination a tube or casing supporting lenses that provide upper and lower telescopes, said periscope having at its upper end a head carrying lenses that provide telescopes of different powers, only one of which telescopes can be used at one time, said head comprising a tube carrying a convex lens that extends transversely the tube, a concave entrant lens that extends transversely the tube, and a plurality of concave entrant lenses of different focal lengths mounted in the sides or walls of said head tube and located at different distances from said convex lens, swinging reflectors, one for each longitudinally extending entrant lens, which reflectors are mounted on a carrier that is within the tube of the head and arranged so that they can be moved from the field of vision between the convex lens and said transversely extending concave entrant lens, the reflectors being mounted so that when it is desired to look at an object through any one of the longitudinally extending entrant lenses the reflectors for the entrant lenses that are located between the convex lens and the entrant lens through which it is desired to view can be caused to be in a position where they will not obstruct the view.

12. A periscope having a tube or casing carrying lenses that provide upper and lower telescopes, a plurality of entrant lenses mounted in the upper end of said tube, and means whereby any one of said entrant lenses will be caused to be in operative relationship with the rest of the lenses in the telescope whereby an object can be viewed by the operator through said entrant lens, there being an electric motor or operating means located within the tube, which electrical means is controlled from the exterior of the periscope tube or casing, the tube or casing being sealed and air-tight whereby no vapor or moisture will be allowed to enter said tube.

13. A periscope comprising in combination a tubular casing having at the upper end thereof a plurality of entrant lenses, movable means whereby any one of said lenses will be caused to be in operative relation with the rest of the lenses in the periscope, an electrically operated power member for actuating said means, means controlling said electrically operated power member, and conductors connecting the electrically operated power member and its controlling means, said conductors passing through openings that are sealed, said periscope being airtight whereby no moisture can enter the said tube.

14. A periscope comprising in combination a tubular casing having at its upper end a plurality of entrant lenses, movable means whereby any one of said lenses will be caused to be in operative relation with the rest of the lenses in said periscope, electrical means within said tube for actuating the movable means, and conductors therefor passing through openings in the casing for controlling the operation of said electrical means, the space around said conductors being sealed and the casing being air or moisture tight so that the entrance of vapor or air will be avoided.

15. A periscope having a plurality of entrant lenses arranged so that they extend along the tube of the periscope and a corresponding number of reflecting means arranged behind said lenses, one of said reflectors being normally held in operative position by spring means, others of said reflectors being normally held out of operative position by spring means, there also being provided a means for removing the reflector that is held in normal operative position by the spring from said operative position, there also being means for moving, as desired, any one of the other reflectors into operative position against the pressure of the spring which normally holds said reflector in inoperative position.

16. A periscope having in combination with a lens which extends along the tube, a reflector that is normally held in operative position, the periscope also having means for moving said reflector from its operative position.

17. A periscope having in combination with a lens which extends along the tube a reflector that is normally held in operative position by means of a spring, the periscope also having means for moving said reflector from its operative position against the pressure of said spring means.

18. A periscope having in combination with a lens which extends along the tube of the periscope a reflector which is normally held in inoperative position, the periscope also being provided with means for moving said reflector into operative position.

19. A periscope having in combination with a lens which extends along the tube of the periscope a reflector which is normally held in inoperative position by spring means, the periscope also being provided with means for moving said reflector into operative position against the force of said spring means.

20. A periscope having in combination with a lens which extends along the tube of a movable reflector which is normally held in operative position relative to said lens, said periscope also having means for withdrawing said reflector from operative position and holding it in said inoperative position.

21. In a sighting device, the combination of a vertical lens tube, an optical system comprising a series of side lenses of different powers, one above the other, an ocular, and means for selectively reflecting rays of light from any of the side lenses to the ocular.

22. In a sighting device, the combination of a vertical lens tube, an optical system comprising a lens at the upper end of the tube, a series of side lenses of different powers, one above the other, means in the tube adapted to be positioned to one side of the axis of the tube and also to be positioned in the axis of the tube for selectively deflecting rays of light from any of the side lenses to the ocular.

This specification signed and witnessed this 2d day of February, A. D., 1916.

FREDERICK L. G. KOLLMORGEN.

Signed in the presence of—
G. McGRANN,
EDWIN A. PACKARD.

Copies of this patent may be obtained for five cents each, by addressing the "Commissioner of Patents, Washington, D. C."